Figure 1:
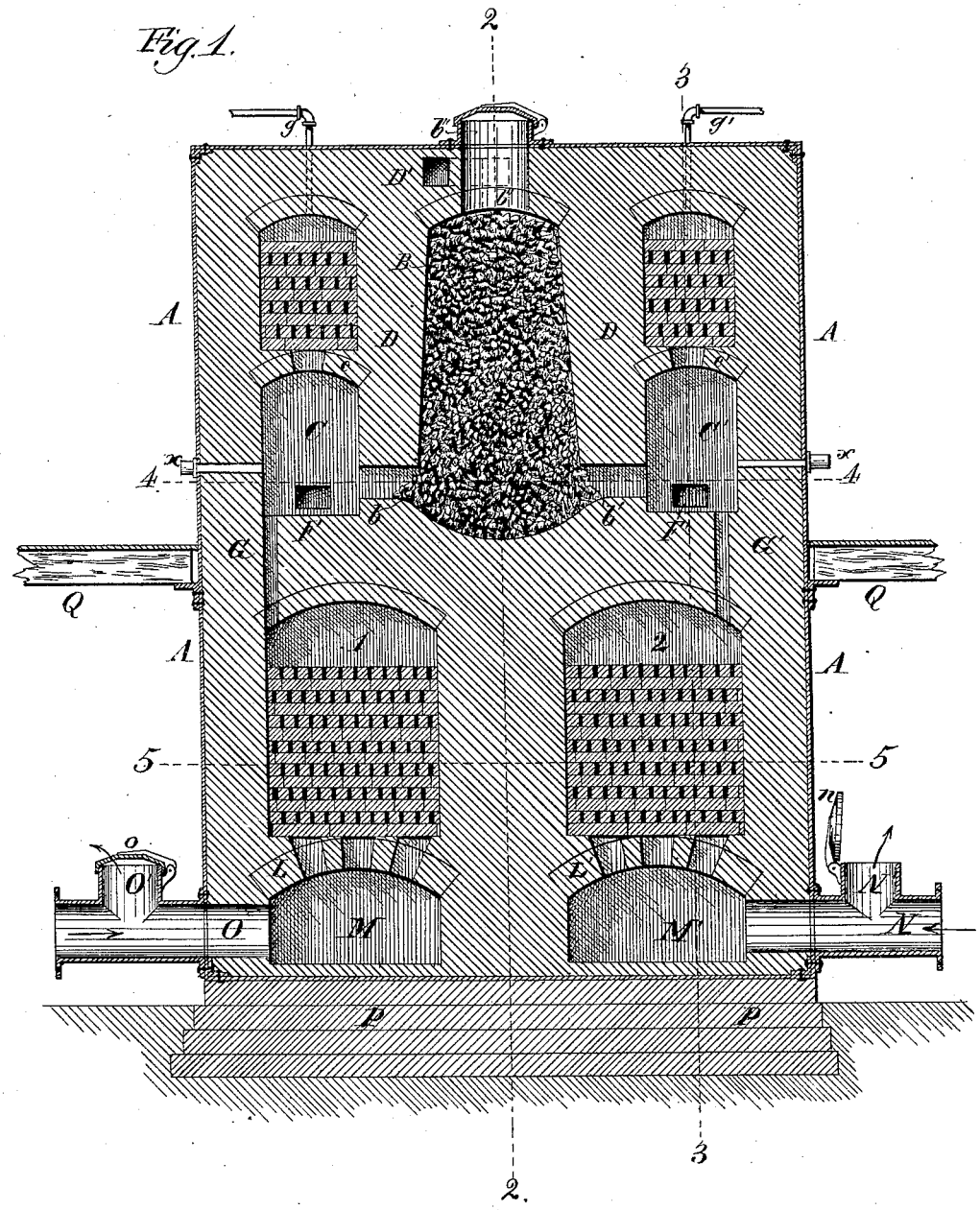

(No Model.) 5 Sheets—Sheet 1.
T. G. SPRINGER.
PROCESS OF AND APPARATUS FOR MANUFACTURING GAS.
No. 280,770. Patented July 3, 1883.

Witnesses:
C. E. Gaylord.
A. M. Billings

Inventor:
Theodore G. Springer (No Model.)

5 Sheets—Sheet 3.

T. G. SPRINGER.
PROCESS OF AND APPARATUS FOR MANUFACTURING GAS.

No. 280,770. Patented July 3, 1883.

(No Model.) 5 Sheets—Sheet 4.

T. G. SPRINGER.
PROCESS OF AND APPARATUS FOR MANUFACTURING GAS.

No. 280,770. Patented July 3, 1883.

Witnesses:
A. M. Billings
James M. Brown

Inventor:
Theodore G. Springer (No Model.) 5 Sheets—Sheet 5.

T. G. SPRINGER.
PROCESS OF AND APPARATUS FOR MANUFACTURING GAS.

No. 280,770. Patented July 3, 1883.

Witnesses:
A. M. Billings
James M. Brown

Inventor:
Theodore G. Springer

UNITED STATES PATENT OFFICE.

THEODORE G. SPRINGER, OF NEW YORK, N. Y.

PROCESS OF AND APPARATUS FOR MANUFACTURING GAS.

SPECIFICATION forming part of Letters Patent No. 280,770, dated July 3, 1883.

Application filed January 6, 1883. (No model.)

*To all whom it may concern:*

Be it known that I, THEODORE G. SPRINGER, of the city, county, and State of New York, have invented certain new and useful Improvements in Processes of and Apparatus for Manufacturing Gas; and I do hereby declare that the following is a full, clear, and exact description thereof, reference being had to the accompanying drawings.
This invention relates to the manufature of heating and illuminating gas in furnaces or cupola-generators in which waste heat carried from the fuel by products of combustion or otherwise is stored in suitable refractory material, and subsequently utilized for heating air, superheating steam, and fixing gases, and it is an improvement on my Patent No. 263,985 and other patents granted to me.

It is designed to more fully store up and utilize the waste heat carried off by the products of combustion, &c., from the combustion and generating chamber; also, to better utilize the rich gas, and the volatile and tarry matters of the coal evolved by the action of direct heat in the generating-chamber, and also to provide a more simple, perfectly operating, and economical apparatus.

In operating the generating apparatus herein described I introduce a suitable flux with the coal, for uniting with the ash and forming a fluid slag which is readily run off, whereby the fuel is kept free from ash and cinder, so that the air, when admitted, comes in direct contact with the carbon, and thus more quickly raises it to incandescence, and so that the steam, when admitted, attacks the incandescent carbon more readily, and is more quickly and thoroughly decomposed.

In carrying out this invention any suitable carbonaceous fuel—such as bituminous or anthracite coal, coke, charcoal, or wood—may be used. The lower portion of a body of fuel is first raised to a state of incandescence by blasts of air from a blower or other forcing device directed transversely across such body of fuel, the products of combustion being withdrawn from the opposite side thereof and passed into suitable loosely-laid brick-work in the form used in regenerators. The products of combustion and of incomplete combustion are divided, a part of them being burned in a combining and fix- ing chamber by a blast of air, and a part being ignited by a blast of air and partially burned in a small regenerator or brick-work heater immediately adjoining the combustion and generating chamber, and then conducted into a large heat-storing or regenerator chamber, where combustion is completed by the admission of fresh blasts of air, and the resulting hot products are passed down through the chamber, where nearly their entire amount of heat is stored in the brick-work before their exit. Air previously heated, if desired, by the heat first stored may now be passed in a reverse direction through the body of fuel, and the resulting products used for heating a second set of regenerating-chambers similar to the first set. This heating of the second set of regenerating-chambers, however, is not essential at this stage of the operation. Steam is admitted, either before or after the heating of the second set of regenerating-chambers, into the top of the steam-superheating chamber last heated, and is highly superheated by passage down through the hot regenerator brick-work filling the chamber. It is then passed on through the tuyeres of the generator into and through the mass of incandescent fuel, where it is decomposed. The resulting hot gases are then passed up through the superincumbent body of hot fuel, which, if it be bituminous coal, is in a state of vaporization or distillation, and combine with the tarry matter and rich vapors and gases being evolved, and carry them out of the generating-chamber in the form of good illuminating-gas, thereby utilizing all the rich, oily, and tarry matter of the coal. The gas conducted away from the top of the generating-chamber is passed into a combining and fixing chamber, and on its way thereto, or in the chamber, it is enriched to any desired degree by hydrocarbon-oil vapor, if it is desired to produce illuminating-gas. In this case the hydrocarbon oil is admitted into the flue through which the gas is passed, or into the combining and fixing chamber, as most expedient, and is quickly vaporized by the heat, and in the fixing-chamber the mixture of water-gas (hydrogen and carbonic oxide) and oil-vapor is combined and converted into a fixed illuminating-gas. If water-gas for heating purposes only is required, then no oil need be admitted. This operation of decomposing steam, &c., is continued till the fuel is reduced below the proper decomposing temperature for steam, when the latter is shut off. Air is then admitted into and forced through the regenerator last heated by the hot products, and is therein highly heated, and is thence blown into the combustion and generating chamber, as in the first instance, till the fuel is again raised to incandescence, the gaseous products from the fuel being at the same time burned by the admission of jets of hot air in the other partially-cooled regenerators, thereby storing the heat of the waste gas in the refractory material, for future use in superheating another blast of steam to be decomposed, and the succeeding blast of air for again raising the cooled fuel to a state of incandescence, as before explained. The fuel having been brought to incandescence, the manufacture of gas by the decomposition of steam, distillation of coal, &c., is continued, as in the first instance.

It is to be understood that during the process of generating gas fresh fuel is supplied automatically and continuously, or intermittently, as consumed, to the combustion and generating chamber, so that there is a constant supply thereof undergoing distillation and giving off rich gases while both the air and the steam are being introduced, and also that the ash and cinder are continuously fluxed and carried off in the form of fluid slag. It will be observed that the air-blasts, previous to their admission to the fuel, are always highly heated, whereby the fuel is quickly raised to a very high temperature, and that very little or none of the heat is lost.

Though the above method of operation is desirable and advantageous, I wish it understood that my process is not limited to the steps carried out in the above-mentioned order, nor to the particular steps above enumerated. Hydrocarbon oils may be admitted into different parts of the combustion and generating chamber upon the fuel for enriching the gases from the decomposed steam, &c.

My peculiarly-constructed generating apparatus admits of different methods of operation without departing from the spirit of my invention, and by slight modifications may be adapted for carrying out a number of processes of producing illuminating and heating gas, as will be hereinafter more fully described; and my particular invention herein will be defined and pointed out in the claims.

My invention includes, besides the process, certain peculiarities of construction and combination of parts in the apparatus, which will be hereinafter more fully described and claimed.

Having stated in general terms the nature and object of my invention, I will now proceed to more particularly describe it with reference to the accompanying drawings, in which—

Figure 2:
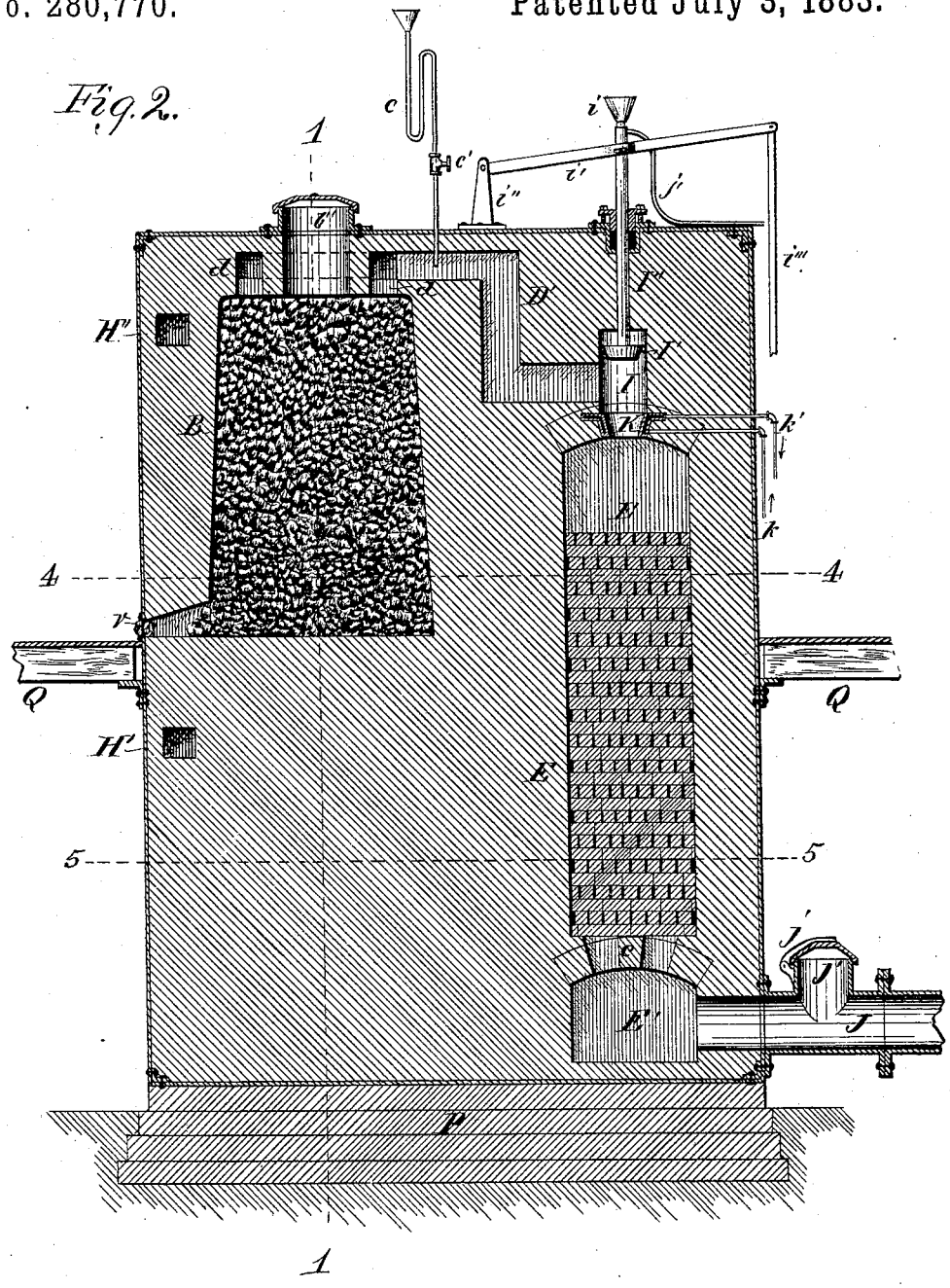
Figure 3:
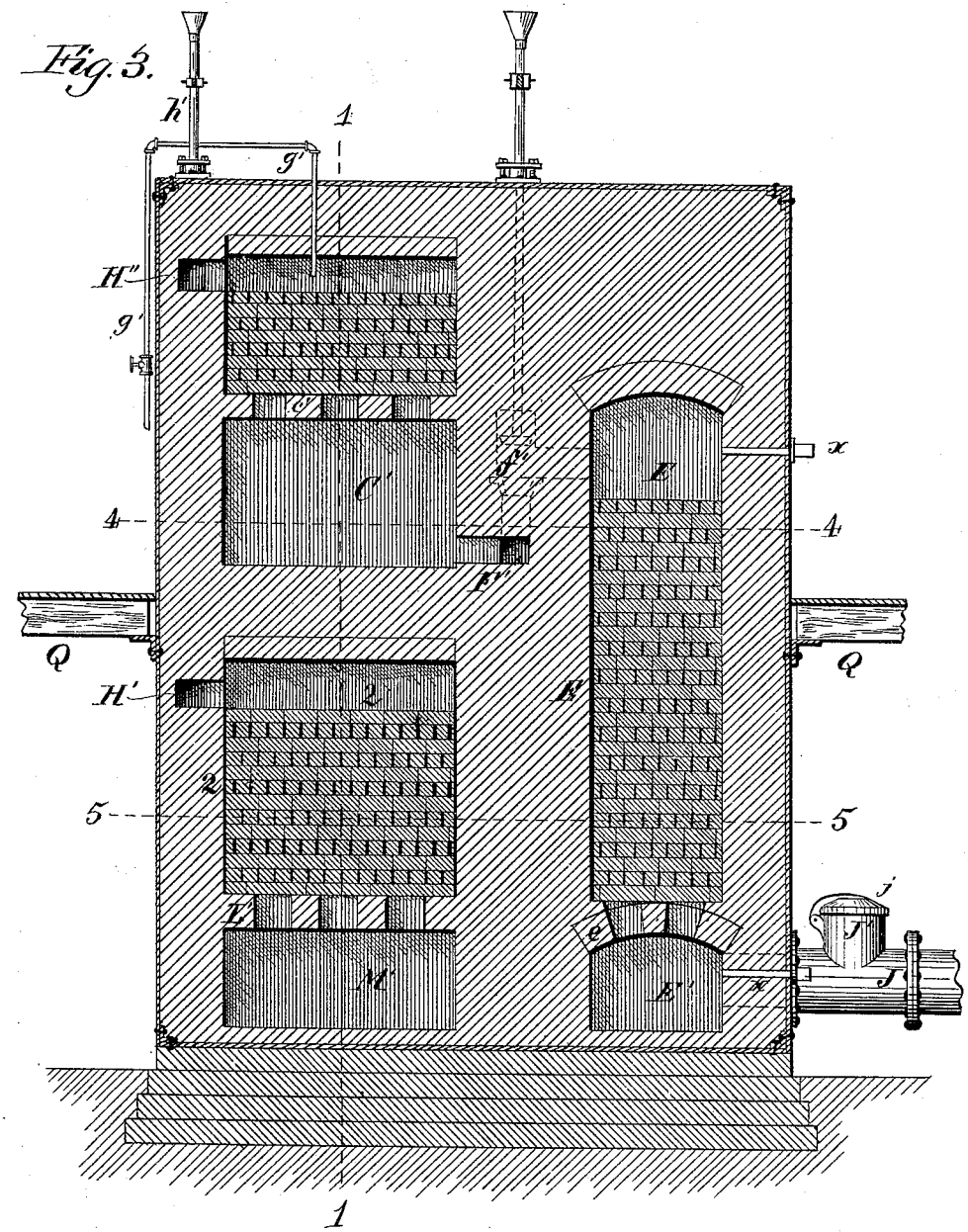
Figure 4:
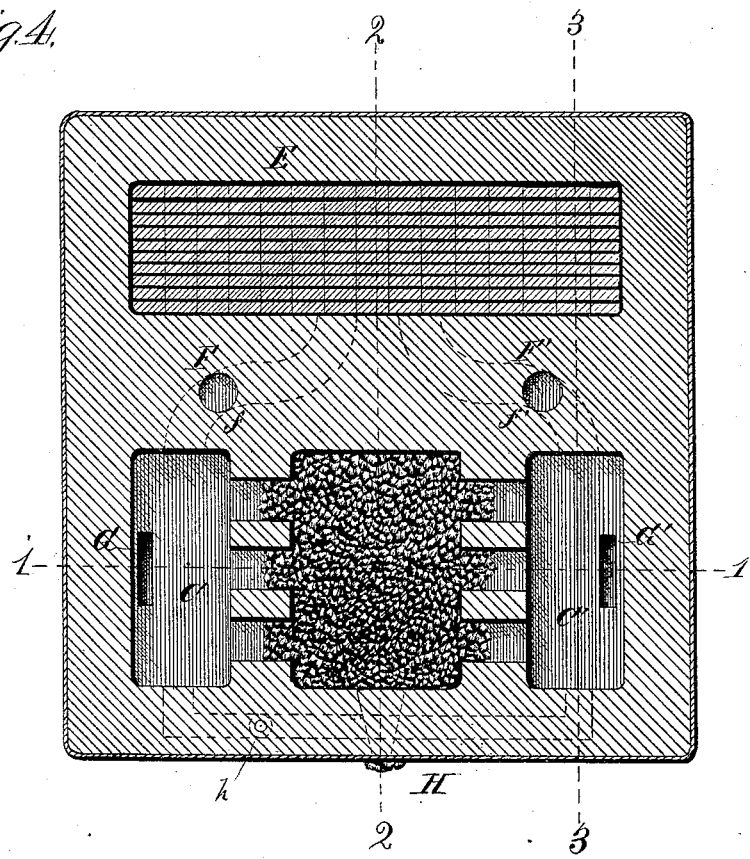
Figure 5:
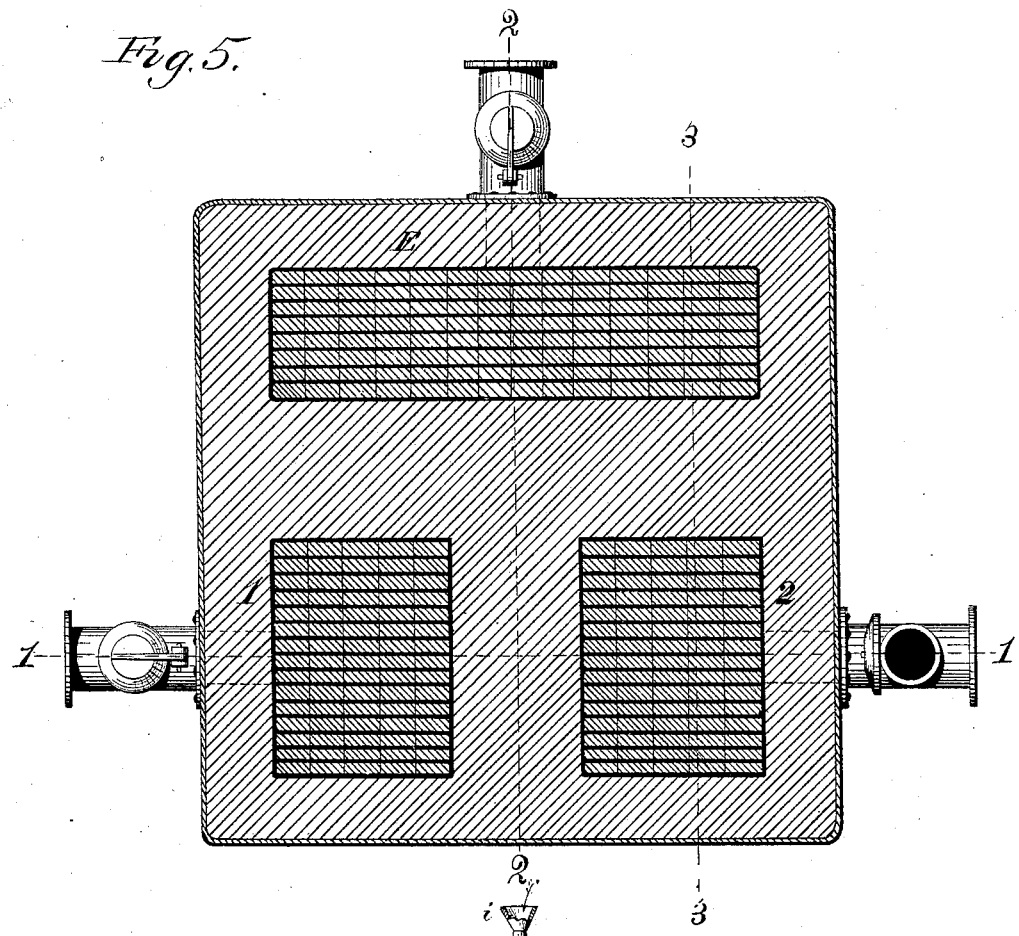
Figure 6:
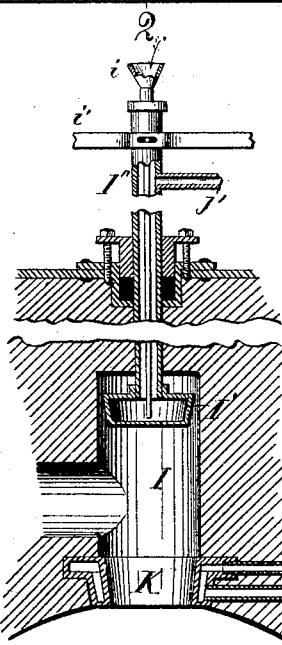

Figure 1 represents a transverse vertical section through the combustion and generating chamber and the two adjacent smaller regenerating or heat-storing chambers and the lower large regenerators, on the line 1 1, Figs. 3, 4, and 5. Fig. 2 represents a vertical section, on the line 2 2 in Figs. 1, 4, and 5, through the generator and the combining and fixing chamber. Fig. 3 represents a vertical section, on the line 3 3 in Figs. 1, 4, and 5, through the regenerators and the combining and fixing chamber. Fig. 4 represents a horizontal section, through the base of the generator and through the combining and fixing chamber, on the line 4 4, Figs. 1 and 2. Fig. 5 represents a horizontal section, through the air-heating regenerator-chambers and the fixing-chamber, on the line 5 5, Figs. 1 and 3. Fig. 6 represents a sectional view, on an enlarged scale, of the water-cooled valve and valve-seat used in my generator.

In the following description the same letters of reference designate like parts in all the figures.

The walls of my generator and regenerators are constructed of fire-brick, and the outer walls, A, thereof are covered with plates of riveted boiler-iron, forming a jacket in the usual manner. The combustion and generating chamber B is built centrally with reference to the smaller regenerating-chambers C C' within substantial brick walls, and has the bottom portion inclined from each side toward the center, as shown in Fig. 1, and also the central depressed portion inclined from back to front, as shown in Fig. 2, to provide for the ready outflow of the liquid slag at a tap-hole, V, in the front wall. The side walls, D, are built so as to diverge from the top to a point near the tuyeres, on the inside, making the combustion and generating chamber wider toward the lower part than at the top, whereby room for expansion of the coal is provided as it is coked, and the charge is evenly fed down as it is consumed at the bottom. The divergence of the side walls may stop at a point above the tuyeres, if desired. One or more rows of tuyeres, b b', are provided in each side wall, D, of the generator, connecting it with each of the side regenerators or superheaters, C C'. The lower parts or faces of the tuyere-passages b b' are inclined downward and inward, and the upper walls thereof may be inclined in the same direction, if desired, to prevent coal and cinder being blown into the chambers C C'. The combustion and generating chamber B is provided at the top with a feed-opening, b'', having a cover or lid, and the gas-eduction pipes d d, connecting directly with the top of the chamber and with the flue D', and an oil-supply pipe, c, having a valve, c', enters the flue D', as shown.

It may be desirable at different times to withdraw the gas from different heights in the generating-chamber, and for such purpose pipes may be connected to the generator below the top thereof; but my process is not limited thereto.

The gas-eduction flue D' connects the top of the generator with the valve-box I, which leads into the combining and fixing chamber E. This chamber E is filled with fire-brick laid in the form used in regenerator-furnaces, and supported on an arch, e, at or near the bottom of the chamber. Below the arch is a chamber, E', with which is connected the outlet-pipe J, provided with a branch purge-pipe, J', having a tight-fitting lid, j. A hollow water-cooled valve, I', having a hollow stem, I'', Fig. 6, is provided for closing the passage-way into the chamber E and controlling the flow of gas thereto. A pipe, i, having a funnel at the top, extends down through the hollow stem into the valve I', for admitting water thereto, and a pipe, j', is connected with the hollow stem I'', for conducting away the hot water or steam. The valve-seat and passage K is also made hollow, and is water-cooled, the water being admitted by pipe k and carried off by pipe k'. Valve I' is operated by lever i', loosely connected to the valve-stem, and pivoted to the standard i'', and having a rod, i''', at the opposite end. The combining and fixing chamber E is connected by two flues, F F', with the base of each of the superheating-chambers C C', Figs. 3 and 4. The flues F F' are provided with valve-boxes f f', each having a water-cooled valve and seat, like those shown in Fig. 6, described above. These flues F F' are used at the same time, one to conduct hot gas and the other hot air from chambers C C' to the combining and fixing chamber E, to be burned therein to raise the contained brick-work to the required temperature for combining and fixing the mixed water-gas and coal or oil vapor, and each flue is used at alternate periods for conducting first gas and then air, according to the direction in which air is being blown through the generator.

The regenerating and steam-superheating chambers C C' are built on each side of the generating-chamber B, and communicate therewith by the tuyere-passages b b', as above described. They also communicate directly with each other by the air pipe or flue H, passing through the front wall, as shown in Fig. 4, and opening into chambers C C' at the top, as shown at H'' in Fig. 3. The flue H is controlled by a valve, h, having a stem, h', extending through the top wall of the furnace, as shown in Fig. 3. The upper portions of the chambers C C' are filled with regenerator brick-work resting on the open or grated arches c c', Fig. 1, and each has a steam-supply pipe, g g', entering at or near its top, for the introduction of steam to be superheated, as required.

The flues G G' connect the chambers C C' with the air-heating regenerator-chambers 1 and 2, placed in the base of the structure, and are for the purpose of conducting hot waste gases down into the chambers, to be burned therein by blasts of air. An air-flue, H, connects the chambers 1 and 2 and opens into the tops thereof, above the brick-work, as shown at H', Fig. 3, for burning the gases from the flues G G', above mentioned. The flue H is to be provided with a controlling-valve like that shown in Fig. 6. The chambers 1 and 2, Fig. 1, are filled with regenerator brick-work laid up in the usual form of regenerators and resting on the open-work arches L L'. Below the arches are formed the chambers M M', with which connect, respectively, the air-supply pipes O N, each having a short branch discharge-pipe for the spent products of combustion, (designated by the letters O' N',) and such discharge-pipes are provided with tight-fitting covers o n, one of which is to be closed when air is being forced through the air-inlet pipe with which it is directly connected. Each of the air-inlet pipes is to be provided with a controlling-valve, (not shown,) to be open when the air-blast is passing and to be closed when the waste products of combustion are passing out through the outlet branch pipe. Sight-holes x are provided, passing through the walls into the various chambers, for inspecting the chambers, in order to determine when they are at the proper working temperature. It is observed that the furnace structure is to be built on a solid brick or stone foundation, P, and is of such a height as to occupy two stories. The upper floor, Q, is built above the regenerators 1 and 2, at about the base of the generator B. The various inlet and outlet pipes and the connecting-flues are to be provided with suitable controlling-valves, and the outlet-gas pipe is preferably provided with a water-seal in a box or main of the usual construction.

A steam inlet-pipe may be provided, connecting with the top of the combining and fixing chamber E, for admitting steam thereto in order to vary the process, when desired.

The combustion and generating chamber should be provided with a door, through which the charge may be ignited and the chamber cleared out or repaired, as occasion arises. The heating and regenerating chambers should also be provided with doors to permit them to be cleaned and repaired when required. A feed-hopper may be connected with the generating-chamber B, and be made sufficiently large to serve as a magazine, from which the fuel is automatically fed down into the generating-chamber by gravity.

It will be observed that the construction of my generating apparatus is quite simple, and that it is convenient of operation, and therefore quite effective and economical for carrying out the process of producing both heating and illuminating gas.

The gas apparatus constructed as above described, and as shown in the drawings, is well adapted to the manufacture of a cheap heating-gas, or to the manufacture of a good high candle-power illuminating-gas at a comparative low price, and has many important advantages for both purposes.

An important feature of construction is the location of the generating-chamber in the upper part of the structure, for the reason that in this position it is much more conveniently operated, charged, and discharged, and that the outgoing hot products to be burned in the regenerators and the gases to be combined and fixed are compelled to pass down through the regenerative brick-work. The passage of the heating products and gases down instead of up through the different chambers is of great advantage in practical operation, for the reason that in passing down the gases are forced against their natural tendency to rise, and are thus spread uniformly out through the entire area of the chambers and held longer in contact with the brick-work, whereby their heat is fully given up to the whole mass of brick before their exit from the chambers, so that they go out comparatively cool and spent, whereas, if passed up through the chambers, the gases, being heated and light, seek the most direct channel through the brick-work and pass quickly out at a comparatively high temperature, having given up but little heat to the brick-work. These facts have been well established by practical operations. In burning the gases and passing the resulting hot products downward their whole volume of heat is stored in the brick-work, and is subsequently utilized for heating the air, superheating steam, and for combining and fixing the mixed water-gas and hydrocarbon vapor from the coal and oil, or either one separately. These features will be more fully and specifically explained hereinafter in the description of the operation of the apparatus.

In operating the apparatus for the production of gas a fire is first kindled in the generating-chamber B. Then the fuel, with a suitable flux—such as caustic lime or carbonate of lime—is charged into the chamber, the lime being in the proportion of about two parts to three parts of silica and one part of alumina contained in the ash of the fuel. The charge of fuel being in position and ignited, the air-blast is first admitted by pipe O through regenerator 1, from which it passes up through flue G into chamber C, and into the fuel through tuyeres $b$, where active combustion ensues. The valve in the gas-eduction pipe D', leading from the top of generator B, being closed, the hot products, consisting largely of carbonic oxide mingled with nitrogen, pass through tuyeres $b'$ into the superheating-chamber C', where they are ignited and partially consumed by a blast of air from chamber C, admitted at opening H" through pipe H by opening its valve $h$. The hot products, still containing combustible matter, impart a portion of their heat to the brick-work of chamber C', and then pass down through flue G' into the top of regenerator 2, where combustion is completed by a blast of air from the opening H', the air being passed from regenerator 1 through a pipe, H, by opening its controlling-valve. The hot products of complete combustion pass down through the brick-work of regenerator 2, where their heat is absorbed, and finally escape comparatively cool from the bottom flue, N, and its branch pipe N', the lid $n$ thereof being open. During the passage of the air-blast in the direction just described it is to be understood that the lid of the branch flue at the bottom of regenerator 1 is closed, and that the valve of air-pipe N, leading to the bottom of regenerator 2, placed beyond branch pipe N', is closed also that the steam and oil are shut off. The chamber C' and regenerator 2 being thus highly heated, the lid $n$ on branch pipe N' is closed and lid $o$ on branch pipe O' is opened, and valve in pipe O closed and valve in pipe N opened, and the air-blast is then reversed and directed through pipe N into chamber M, then up through the regenerator 2, where it is highly heated, thence through flue G' into the base of chamber C', from which it passes through tuyeres $b'$ into and through the fuel in chamber B, where active combustion again ensues. The resulting hot products, chiefly carbonic oxide and nitrogen, pass into chamber C, where they are partially burned by a blast of hot air admitted into the top of chamber C through pipe H, and the hot products still containing combustible matter pass down through flue G into the top of regenerator 1, where complete combustion takes place by means of a blast of hot air admitted from regenerator 2 through pipe H, and the hot products of complete combustion pass down through the brick-work in regenerator 1, where their heat is fully absorbed, and finally escape by the branch pipe O', the lid $o$ of which is open. At the end of this operation the lid $o$ is closed, and the valve in the air-inlet pipe N is also closed.

It is to be borne in mind that during the operation of heating up, as last described, a portion of the hot air from regenerator 2 is passed from the base of chamber C', through flue F' and valve-box $f'$, into the top of the combining and fixing chamber E, and at the same time a portion of the hot carbonic-oxide gas from the generator is passed from the base of chamber C, through flue F and valve-box $f$, into the top of chamber E, where it is burned by the hot air above mentioned from the flue F'. The resulting hot products of combustion are passed down through chamber E, where their heat is almost wholly absorbed by the contained brick-work, which becomes highly heated, and the spent comparatively cold products pass off through branch pipe J', the lid $j$ of which is open.

It is to be understood that the hot products, in passing down through the regenerating-chambers, are forced in opposition to their tendency to rise, and hence spread out uniformly through the whole area of the chambers, and are so delayed in their outward course that their heat is wholly absorbed by the brick-work, to be afterward utilized in heating air, superheating steam, and combining and fixing mingled vapors and gases. The chamber E being properly heated to the desired temperature, the lid $j$ is tightly closed, the valves in boxes $f\ f'$ are closed, and the valve I' in flue D', leading from the generator B to chamber E, is opened, and my apparatus is now ready to commence the operation of making heating or illuminating gas.

In order to start the operation, steam is admitted into the top of the superheater last heated—that is, into chamber C—through pipe $g$, and is passed down through the hot brick-work, where it is superheated. It is thence passed through the tuyeres $b$ into and through the incandescent fuel in chamber B, where it is rapidly decomposed, resulting in hydrogen and carbonic oxide, which gases are passed up through the superincumbent body of hot fuel, taking up the rich gases and oily vapors being evolved from the upper portion thereof, and thence passed out highly enriched through the eduction-pipe D' into the combining and fixing chamber E. On their passage through flue D' the gases may be further enriched by oil admitted through pipe $c$; or they may be enriched by oil admitted into the top of chamber E, the oil being quickly vaporized by the heat of the flue or chamber, and the hot gases and the vapors are mingled with the hot gases from the generator. The gases, being suitably enriched to the degree required for making good illuminating-gas, are passed down through the hot brick-work of chamber E, where by the heat they are combined and converted into a fixed illuminating-gas, which is passed from chamber E' through pipe J into the hydraulic main, and thence through the condensers and purifiers into the holder. The decomposition of steam and the combining and fixing of the resulting gases with oil-vapor or rich coal-gas are continued till the temperature of the fuel is reduced below the suitable decomposing degree, and the fixing-chamber is also cooled down, at which time the steam is shut off, the oil is shut off, and the valve I' in the flue D' is closed. The valves $f\ f'$ in flues F F' are again opened, the lid $j$ of branch pipe J' and the lid $n$ of the branch pipe N' are also opened, and air is admitted through the pipe O and highly heated by passage through regenerator 1—the chamber last heated—and is thence conducted into and through the generator till the fuel is again raised to incandescence, the resulting hot products being at the same time burned by blasts of hot air in the regenerating-chambers C' and 2, and in the combining and fixing chamber E, as previously described.

It is here remarked that by reason of using hot air, and also by having the chambers all built together in one brick structure, the coal or other fuel is raised to incandescence in a very short time—much quicker than in the ordinary furnaces with a cold blast—and the regenerating and fixing chambers are correspondingly quickly heated for the same reason. The fuel having been raised to incandescence and the regenerating-chambers and the fixing-chamber raised to the desired temperature, the valves are properly operated and steam again decomposed, all as previously described, and the manufacture of gas thus continued. When heating-gas is the only product desired, the fuel is raised to incandescence, and the hot products are burned by blasts of hot air in the regenerating-chambers and the fixing-chamber for raising them to the desired temperature. Steam is then decomposed in the hot fuel of the generator, and the resulting hot gases passed up through the fuel, where they carry off the rich vapors, and pass with them into the hot chamber E, which now becomes a decomposing-chamber, for producing a large additional volume of heating-gas. In order to produce the additional volume of heating-gas, steam and oil are admitted to the top of chamber E and are decomposed by the hot brick-work, resulting in a large volume of heating-gas composed of hydrogen and carbonic oxide, which mingle with the heating gases and vapors from the generator, which are properly fixed by passage through the hot brick-work, and pass off to a place of storage or to a place of immediate use, to be burned while hot. I thus obtain a very large supply of heating-gas made in the generator and in the decomposing-chamber E in a very short period of time. The periodical decomposition of steam, coal, and oil and the heating up of the generator and the brick-work regenerators are pursued in making heating-gas, as before described. The generator, being almost surrounded with superheaters and regenerators, is easily kept hot, as it has very little radiating-surface exposed, and the decomposition of steam may thus be continued for a comparatively long time before the temperature of the fuel is reduced too low, while the temperature of the fuel is very quickly restored to incandescence by the blasts of hot air used. The blasts of hot air are favorable to the production of a large percentage of carbonic oxide, for the reason that it quickly raises the fuel to a high heat, and carbon at a high temperature yields, by the introduction of air, a comparatively large per cent. of carbonic oxide and a small per cent. of carbonic acid. This has been demonstrated by many practical experiments. I thus obtain a large amount of carbonic oxide for combustion in the superheaters and regenerators, and the gas, being burned while hot by means of hot air, imparts a high heat to the regenerator brick-work, which is subsequently utilized for heating blasts of air and steam supplied to the generator. The steam supplied to the generator, being also superheated, maintains the fuel at a decomposing temperature for a longer period than usual. The air and steam being heated by heat from gas or products usually wasted, the economy of my process is apparent. Care should be taken that just the necessary quantity of air is admitted to produce complete combustion of the gas in the superheater, the regenerator, and fixing-chamber, in order to obtain the full calorific value of the gas, as a deficiency of air results in incomplete combustion and consequent waste of gas, while an excess of air, though producing complete combustion, lowers the temperature of the gases and carries off the heat rapidly.

As indicated above, my apparatus is adapted for carrying out a number of modified processes for the production of gas, and several of such processes are described as follows:

If it is desired to obtain hydrogen as the final product, the chamber E is highly heated, as before explained, and is used as a decomposing-chamber, then water-gas produced by the decomposition of steam, and consisting of hydrogen and carbonic oxide, is conducted into the hot chamber E. Here an additional supply of steam is admitted, so as to be in excess, and the following reaction takes place: The steam is decomposed by the carbonic oxide of the water-gas in contact with the heated brick-work setting hydrogen free from the steam, while its oxygen is combined with the carbon of the carbonic oxide (C O) to form carbonic acid, (C O$^2$,) so that the entire product is composed of hydrogen and carbonic acid, the hydrogen being derived from the steam decomposed by the incandescent fuel, and from the steam decomposed by the carbonic oxide in contact with the highly-heated brick-work of the decomposing-chamber E, whereby a large volume of hydrogen results. The carbonic acid mechanically mixed with the hydrogen is subsequently absorbed and removed by passing the gas through caustic or quicklime, which may be cool or heated, as preferred, and such lime, after having become foul and changed to carbonate, is revivified or reburned in the old and well-known manner. The production of hydrogen may be carried out by the admission of hydrocarbon-oil vapor with steam, the latter being preferably superheated and in excess, into the hot decomposing-chamber E, when the reactions above mentioned take place, resulting in the production of hydrogen and carbonic acid, as explained with reference to water-gas and steam. The introdroduction of hot water-gas and oil-vapor into the hot decomposing-chamber E may take place at the same time, provided that sufficient steam is admitted to reduce by the action of its oxygen all the carbon to carbonic acid, while its hydrogen is set free. The hydrogen, after purification, may be used for heating purposes, or may be enriched with hydrocarbons and the mixture converted into a fixed illuminating-gas of high candle-power.

When it is desired to produce cheap heating-gas consisting of carbonic oxide and nitrogen or of carbonic oxide and hydrogen, a poor quality and low grade of coal or coke, or even breeze or sawdust and chips of wood, may be used in the generator.

The first process above described, in which blasts of hot air are used in raising the fuel to incandescence and in burning the hot products for heating the regenerators and the fixing and decomposing chamber, and in which hot gases from the decomposed steam are passed up through the distilling-coal for combining with and carrying off the rich gases and vapors being evolved therefrom, and in which such gases are combined and converted into a fixed gas, constitutes the main part of my invention, so far as the process is concerned.

There are many valuable features in the apparatus, and the particular features and combinations constituting my invention are pointed out in the claims.

The generator or its hopper may be conveniently charged with fuel by dumping-cars running on rails above or on top of the generator. The ash is conveniently removed in the form of fluid slag, which is much more easily handled than the ordinary bulky ash and cinder.

Having described my invention, what I claim, and desire to secure by Letters Patent, is—

1. The process of generating gas, which consists in raising to incandescence by blasts of air the lower portion of a body of carbonaceous fuel, burning the resulting products by air-blasts and storing their heat in bodies of refractory material, superheating steam by passing it through a portion of the heated refractory material, decomposing the steam by passing it into and through the incandescent fuel, and causing the resulting hot gases to pass up through a superincumbent body of coal in a state of distillation to combine with and carry off the rich vapors and gases being evolved therefrom, or from oil, in the manner described.

2. The process of producing gas, which consists in raising to a high temperature a body of fuel by blasts of air, storing the heat produced by the combustion of the resulting gases in a body or bodies of refractory material, decomposing steam in the hot fuel, and conducting the resulting gases up through the fuel in which rich gases are being evolved, thus continuing the operation till the fuel is reduced below the proper decomposing temperature, then heating a blast of air by passage through the previously-heated body of refractory material, again raising the fuel to a high heat by jets of such hot air, and at the same time burning the resulting products by jets of the hot air in another body or bodies of refractory material, and then continuing the production of gas by the decomposition of steam, as in the first instance, whereby the heat of waste gases is stored up and utilized for heating air, and the fuel thereby quickly raised to incandescence and the heat therein longer maintained.

3. The improvement in the process of making gas, consisting in raising the lower portion of a body of fuel to incandescence by transverse blasts, as described, fluxing the ash and conducting it off in the form of fluid slag, continuously supplying fresh fuel at the top as it is consumed at the bottom, and maintaining the production of gas by successive blasts of hot air and steam, in the manner described.

4. The process of generating gas, which consists in raising to incandescence a body of fuel by blasts of hot air, burning the resulting hot products by blasts of hot air, and storing the heat in refractory material, superheating steam in a portion of the refractory material, decomposing it in the incandescent fuel, and conducting the resulting gases up through the superincumbent fuel in a state of distillation, and thereby carrying off the rich gases and vapors being evolved, then passing the mixed gases and vapors into a heated chamber, and there combining and fixing them by heat.

5. The process of generating gas, which consists in raising to incandescence a body of fuel by blasts of air, burning the resulting hot products by blasts of air, and storing the resulting heat in bodies of refractory material, as an air-heater and a decomposing-chamber, decomposing steam in the incandescent fuel and conducting the resulting gases up through the superincumbent body of fuel, and thereby carrying off the rich gases and vapors being evolved from the coal or from oil, then passing the mixed gases and vapors into the decomposing-chamber, previously heated by the combustion of waste gas, there admitting steam in excess with the gases and vapors, and causing decomposition of the mixture into hydrogen and carbonic acid, and finally conducting the gases away, to be purified or stored for subsequent use, as described.

6. The process of generating gas, which consists in raising to incandescence the lower portion of a body of fuel by forcing blasts of air transversely through it and withdrawing the gaseous products directly from the lower portion of the fuel, burning such products by blasts of air in a chamber or chambers adjoining the generator, thereby generating hydrocarbon vapors or gases in the upper portion of the body of fuel, then decomposing steam in the incandescent fuel and conducting the resulting hot gases directly up through the superincumbent body of fuel in a state of distillation, for combining with and carrying off the rich gases or vapors there being evolved.

7. The process of producing a fixed illuminating-gas, which consists in highly heating the lower portion of a body of fuel by blasting with air and withdrawing the resulting gaseous products transversely, burning such products by blasts of air, and storing the heat in masses of refractory material, as described, superheating steam in a portion of the refractory material, decomposing it in the highly-heated fuel, and passing the resulting hot gases through the upper portion of the body of fuel, then enriching the gases by hydrocarbon oil or vapor, and finally combining and fixing the enriched gases in a separate heated chamber.

8. In an apparatus for the production of gas, the generating-chamber having the opposite tuyere-openings at the bottom part, as described, and the charging and gas-eduction pipes in the upper portion, in combination with the superheating and regenerating chambers, one on each side, and air and steam supply pipes and connections, as described.

9. In a gas-generating apparatus, the combustion and generating chamber, having the side walls diverging from above downward, forming a chamber of gradually-increasing diameter from the top to near the bottom, and the bottom inclined downward and inward, and the depressed central portion inclined from back to front, the front wall having a tap-hole and the side walls having the opposite tuyeres, in combination with suitable connections for supplying air or steam and carrying off the gas.

10. In combination with the generator having the opposite sets of tuyeres, the superheating-chamber C, the regenerator 1, and the connecting-flue, and suitable pipes for the supply of air and steam, as described.

11. In combination with the generator constructed with opposite tuyeres at the bottom and with fuel-supply opening and gas-discharge pipes near the top, the two superheaters, one on each side, and the two regenerators 1 and 2, the flues connecting the superheaters and regenerators, and the air-flues connecting the two regenerators, as described.

12. In combination with the generator having the passages described, the superheaters C C', and the connecting-flue H, having controlling-valve $h$, and connections for supplying air and steam, as described.

13. In combination with the generator constructed with tuyeres at the bottom and with the feed and discharge pipes at the top, the two superheaters, one on each side, the two regenerators 1 and 2, the decomposing and fixing chamber E, and the connecting-flues for gas, air, and steam, substantially as described.

14. A cupola gas-generating apparatus constructed with the combustion and generating chamber at the top thereof, and the regenerating-chambers connected by one or more air-flues at the bottom, or below the generating-chamber, and with suitable flues connecting the generator with the regenerators, for the purpose described.

15. A cupola gas-generating apparatus having the combustion and generating chamber, the regenerators for superheating steam, the regenerators for heating air, and the decomposing and fixing chamber, all in one structure, and provided with connecting-flues and with suitable inlet and discharge pipes, for the purpose described.

16. A cupola gas-generating apparatus having the combustion and generating chamber, the regenerators for superheating steam, and the decomposing and fixing chamber filled with refractory material all in one structure, and provided with connecting-flues and with suitable inlet and discharge pipes, for the purpose described.

17. In the manufacture of gas, the method of heating up the generator and the regenerators preparatory to the generation of gas, which consists in highly heating the lower portion of the body of fuel in the generator by blasting with air and withdrawing the resulting gaseous products transversely, at the same time causing such products to pass down into the tops of the regenerators, and there burning them by blasts of air, and passing the hot products of combustion down through such chambers in contact with the contained bodies of refractory material, whereby the hot products are delayed and spread out through the whole area of the chambers and their heat fully absorbed by the refractory material.

In testimony that I claim the foregoing as my invention I have signed my name in the presence of two subscribing witnesses.

THEODORE G. SPRINGER.

Witnesses:
 A. M. BILLINGS,
 JAMES M. BROWN.